United States Patent
Matzen

(10) Patent No.: US 6,763,729 B1
(45) Date of Patent: Jul. 20, 2004

(54) METHOD FOR TESTING AN ELECTROMAGNETIC FLOWMETER, AND AN ELECTROMAGNETIC FLOWMETER ARRANGEMENT

(75) Inventor: Steen M. Matzen, Sønderborg (DK)

(73) Assignee: Siemens Flow Instruments A/S, Nordborg (DK)

(*) Notice: Subject to any disclaimer, the term of this patent is extended or adjusted under 35 U.S.C. 154(b) by 0 days.

(21) Appl. No.: 09/548,026

(22) Filed: Apr. 12, 2000

(30) Foreign Application Priority Data

Apr. 16, 1999 (DE) .......................................... 199 17 268

(51) Int. Cl.[7] .............................................. G01F 1/58
(52) U.S. Cl. .................................. 73/861.12; 73/861.17
(58) Field of Search ............................. 73/861.12, 0.16, 73/0.17

(56) References Cited

U.S. PATENT DOCUMENTS

| | | | |
|---|---|---|---|
| 3,802,263 A | 4/1974 | Krechmery | |
| 3,880,446 A | 4/1975 | Tucker | |
| 3,965,738 A | 6/1976 | Watanabe | |
| 4,010,644 A | 3/1977 | Bonfig | |
| 4,157,035 A | 6/1979 | Doll | |
| 4,167,871 A | * 9/1979 | Shauger et al. | |
| 4,676,112 A | 6/1987 | Uematsu | |
| 4,784,000 A | * 11/1988 | Gaertner | .................. 73/861.12 |
| 4,916,381 A | 4/1990 | Gelecinskyj | |
| 5,639,970 A | 6/1997 | Schulz | |
| 6,043,660 A | 3/2000 | Bahr | |

FOREIGN PATENT DOCUMENTS

| | | |
|---|---|---|
| DE | 2619971 A | 11/1977 |
| GB | 2309308 A | 7/1997 |

* cited by examiner

Primary Examiner—Harshad Patel
(74) Attorney, Agent, or Firm—Barnes & Thornburg

(57) ABSTRACT

A method for testing an electromagnetic flowmeter and a flowmeter are described, the flowmeter having a measuring tube (2) and a coil arrangement (3, 4) for generating a magnetic field perpendicular to the direction of flow through the measuring tube (2), the current direction in the coil arrangement being periodically changed. In this connection, it is desirable for simple monitoring to be possible. For that purpose, after changing the current direction, at least one parameter of the current rise is determined and this is compared with a reference value. For this, the flowmeter has a testing device (20, 25) which, after a change-over of the current direction, determines at least one parameter (T) of the rise in the current in the coil arrangement (3, 4, 30) and compares it with a given value.

17 Claims, 3 Drawing Sheets

METHOD FOR TESTING AN ELECTROMAGNETIC FLOWMETER, AND AN ELECTROMAGNETIC FLOWMETER ARRANGEMENT

BACKGROUND OF THE INVENTION

The invention relates to a method for testing an electromagnetic flowmeter having a measuring tube and a coil arrangement for generating a magnetic field perpendicular to the direction of flow through the measuring tube, the current direction in the coil arrangement being periodically changed. The invention also relates to an electromagnetic flowmeter arrangement having a measuring tube, a coil arrangement for generating a magnetic field substantially perpendicular to the direction of flow through the measuring tube, an electrode arrangement substantially perpendicular to the direction of flow and to the magnetic field, a supply system for the coil arrangement, which has a current direction reversal arrangement, and a testing device.

A method and a flowmeter arrangement of that kind are known from GB 2 309 308 A. Here, testing is carried out by interrupting the normal connection between the measuring tube, that is, the electrode arrangement, and the coil arrangement, and by linking up an external measuring loop. During testing, a normal measurement is not therefore possible. There is also the danger that the interruption of the circuit and the subsequent connection will again cause errors that will not be identified. Testing is effected in that the ohmic resistance of the coil arrangement is determined by applying a voltage to the coil. As soon as the ohmic resistance is known, the voltage is interrupted and the inductance of the coil arrangement is determined by monitoring the decay of the current.

U.S. Pat. No. 5,639,970 describes a current selecting circuit for an electromagnetic flowmeter. This circuit is able to select the correct current and the correct frequency in dependence on the chosen flowmeter. The decision is made by monitoring the response of a coil to energization at relatively high frequency. The faster the signal response is, the greater can be the current through the coil arrangement.

SUMMARY OF THE INVENTION

The invention is based on the problem of enabling the flowmeter to be tested in the simplest possible manner.

That problem is solved in a method of the kind mentioned in the introduction in that after the change in the current direction at least one parameter of the current rise is determined and this is compared with a reference value.

The coil arrangement forms an inductor. In an inductor, the current cannot "jump". After the direction reversal, it therefore needs a certain time until it is again at its set value. The rise in the current is a kind of "fingerprint" for the corresponding flowmeter. As long as the flowmeter can operate undisturbed, that is, free from defects, the rise characteristics are practically identical with a very small range of variation range. Only when an electrical or magnetic defect occurs will the rise characteristic change. This is then an indication that the flowmeter is possibly supplying inaccurate measurement results and must be tested or exchanged. This construction has the advantage that both the electrical property and the magnetic properties are tested, since both electrical and magnetic influences have a characteristic effect on the rise of the current.

Testing is preferably carried out during measurement of a throughflow. Measurement of the throughflow does not even have to be interrupted, yet it is nonetheless possible to carry out testing virtually continuously or permanently. This has the advantage, moreover, that the flowmeter is tested precisely in the situation in which it is also operative.

In this connection, is it preferred that the reference value is determined at the flowmeter itself at an earlier time. At a specific time, therefore, for example, on commissioning, the desired parameter is established and this is stored as reference value so that it is available for future testing procedures. Each flowmeter therefore receives an individual reference value, so that testing can be carried out very accurately. Defects that can result from an erroneously pre-set reference value are virtually unknown.

The time period that elapses between two predetermined current values is preferably used as parameter. Since the rise in the current conforms to a predetermined physical natural law, as a rule an e-function, it is sufficient to determine the rise time between two values to obtain reliable evidence of the current rise per se.

Alternatively, or in addition thereto, in a further preferred construction the time period that elapses between change-over of the current direction and reaching a predetermined current value can be used as parameter. The time of change-over is identifiable very exactly. For example, the change-over signal can also be used as a trigger signal for a time-counter. The predetermined current value can be, for example, close to the maximum current value, that is, close to the current that exists in continuous operation. A relatively long period of time is therefore available, so that the testing can produce a correspondingly accurate result.

After change-over, a stepped-up voltage is advantageously used. This voltage, also known as the "boost" voltage, accelerates the build-up of the magnetic field, and consequently enables the actual measurement to be performed more quickly again. It does also change the current rise, but if the current rise is always carried out in the same manner, that is, with the same increased or "boost" voltage, the characteristic of the current rise can also be used here for testing.

Advantageously, the supply voltage of the coil arrangement is regulated ratiometrically in relation to a reference voltage, which is also used to determine the parameter. Voltage fluctuations cannot therefore have an adverse effect on the test result. The characteristic of the current rise is then the same, regardless of possible voltage fluctuations, which, of course, if possible, should not occur at all.

As an alternative or in addition to the above-mentioned parameters, the curve shape of the current rise can be used as parameter. This does increase the complexity of the testing, but allows even more reliable results.

In this connection it is preferred that the curve shape is formed by current values ascertained at predetermined times. These current values can be converted, for example, into digital signals that are evaluated in a microprocessor. The microprocessor can then compare the curve for the measured build-up of the coil current with one or more reference curves. The entire waveform can therefore be monitored. A curve shape varying from the target curve enables one to draw conclusions as to whether there is a variation in the magnetic circuit or in the electric circuitry.

Preferably, current rises following directly one after the other are compared with one another. In this way, information as to whether the build-up of the magnetic field is proceeding symmetrically is additionally obtained.

The problem is also solved by an electromagnetic flowmeter arrangement of the kind mentioned in the introduction, in that the testing device comprises means which, after a change-over of the current direction, determine at least one parameter of the rise in the current in the coil arrangement and compare it with a predetermined value.

As explained above in connection with the method, the rise in the current after change-over of the current direction in the coil arrangement is a significant feature of each flowmeter arrangement. As long as the flow meter arrangement does not change, this feature also remains unchanged. Variations point to a defect or at least to an inaccuracy. When the rise or a parameter depending thereon is compared with a given value, defects can be identified reliably and above all in good time.

The testing device preferably comprises a time-counter, and a rise time serves as parameter. Although in this case just a single variable is determined during each current rise, this is sufficiently reliable to allow credible testing or monitoring.

The testing device preferably comprises a comparator, which compares the current or a variable derived therefrom with a given value and which is connected to the time-counter. The comparator therefore triggers the time-counter whenever the current (or rather a voltage associated therewith) reaches a fixed given value. The time-counter then stops counting and has then, as it were, determined the length of time that the current has needed for its rise.

The time-counter is advantageously connected to a checking unit, which produces an error message whenever the time ascertained differs by more than a predetermined difference from a given value. An exact conformity of the rise time will be reached only in the rarest cases. A small tolerance range is allowed. If, however, the individual times lie outside this tolerance range, a defect is identified.

In series with the coil arrangement there is preferably arranged an electrical resistance, the temperature-dependent resistance behaviour of which is inversely proportional to that of the coil arrangement. Thermal influences on the coil current can consequently be compensated. The testing can therefore work within a relatively large temperature range with greater accuracy.

Preferably, a supplementary voltage supply system is provided, which is connected to the supply system by way of a change-over switch. After the change in current direction, first of all the supplementary voltage supply system with a higher voltage is used to build up the coil current. Return to "normal" supply voltage is effected only when the coil current has reached a predetermined value. In that case, change-over to the supplementary voltage supply system can also be used as a starting time for the time-counter.

It is also preferred that the arrangement comprises an analogue-to-digital converter, which determines the analogue values in relation to a reference voltage, the value of which is also used as starting point for determining coil current and coil supply voltage. A constant relationship between the reference voltage of the analogue-to-digital converter, the coil current and the coil supply voltage can consequently be achieved. In this way, high measuring accuracy is achieved, without unduly high demands being made in respect of stabilising of the reference voltage, the coil current or the coil supply voltage.

BRIEF DESCRIPTION OF THE DRAWINGS

The invention is described in detail hereinafter with reference to preferred exemplary embodiments in conjunction with the drawings, in which.

DESCRIPTION OF THE PREFERRED EMBODIMENTS

Figure 1:
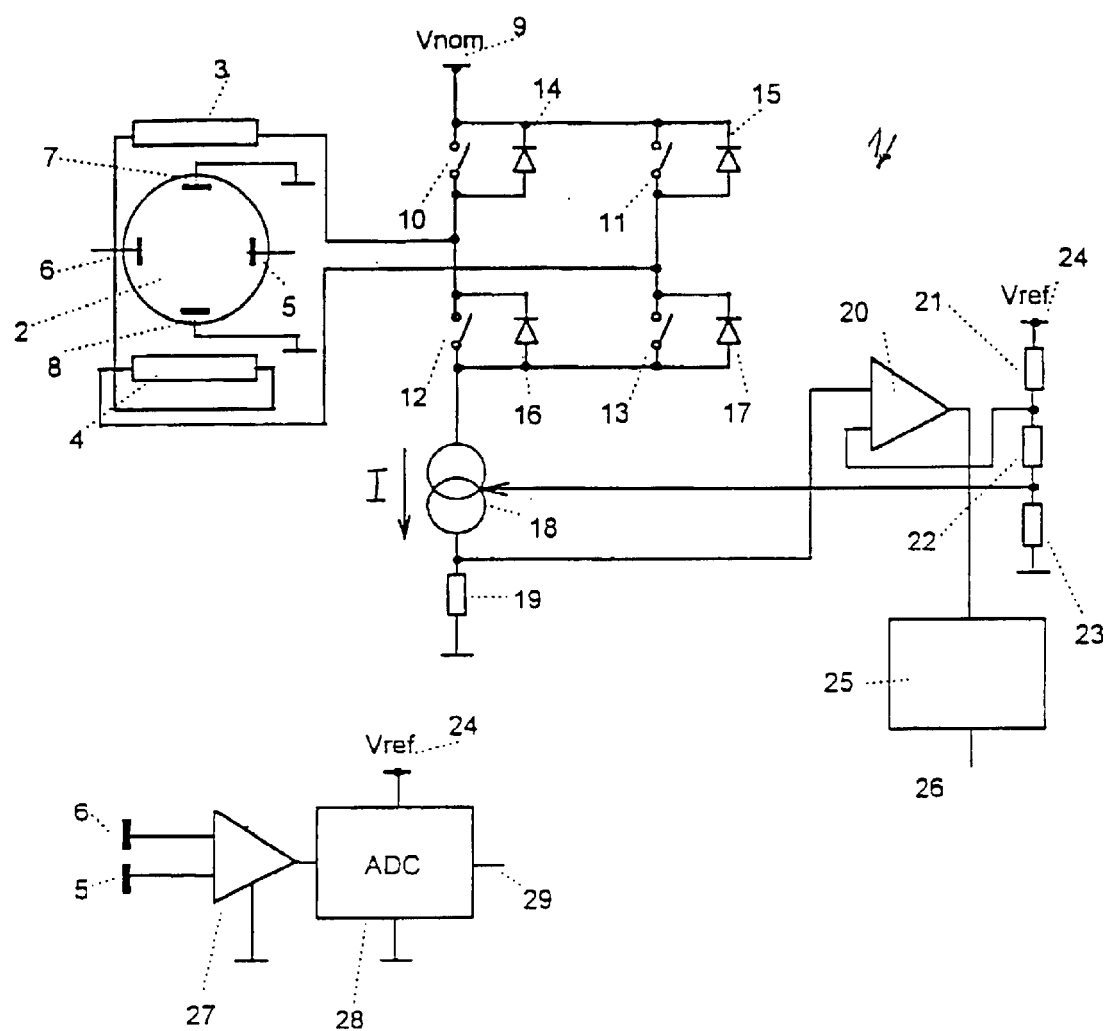
FIG. 1 shows a first embodiment of the invention.

FIG. 1 shows an electromagnetic flowmeter 1 having a measuring tube 2, the flow through which is perpendicular to the plane of the drawing. The measuring tube 2 is electrically insulated. Arranged perpendicular to the direction of flow is a coil arrangement consisting of two coils 3, 4, which generate a magnetic field perpendicular to the direction of through-flow when current flows through the coils 3, 4. Measuring electrodes 5, 6 and earth electrodes 7, 8 are provided in the measuring tube 2. The measuring electrodes 5, 6 are arranged so that they detect a potential difference or voltage perpendicular to the direction of through-flow and perpendicular to the magnetic field. The voltage between the electrodes 5, 6 rises in a manner known per se as the speed of the fluid in the measuring tube 2 increases and as the magnetic field increases.

The coils 3, 4 are connected in series and are supplied from a supply source 9 with a voltage Vnom, the direction of the coil current being determined by an H-bridge circuit with four switches 10–13, each switch being protected by a free wheeling diode 14–17. When the current is intended to flow anti-clockwise (as seen in FIG. 1) through the coil arrangement 3, 4, the switches 10, 13 are closed. The switches 11, 12 remain open. When the current direction is to be reversed, the switches 11, 12 are closed and the switches 10 and 13 are opened.

The coil current is regulated by a current regulator 18, which is to ensure that the current through the coil arrangement is constant. The current I through the coil arrangement 3, 4 is then passed through a measuring resistor 19. The measured voltage across the measuring resistor is supplied to a comparator 20, the other input of which is supplied with a constant voltage that is obtained from a voltage divider comprising three resistors 21, 22, 23 with a reference voltage Vref at their input 24. The output of the comparator 20 is connected to a timer 25. The timer 25 is additionally connected to a control circuit, not specifically shown, which controls the operation of the switches 10–13.

For the rest, the measuring electrodes 5,6 are connected to a differential amplifier 27, the output of which is connected to an analogue-to-digital converter 11. The analogue-to-digital converter 28 is supplied from the same reference voltage source 24 as the voltage divider comprising the resistors 21–23. At its output 29 it produces digital values for the through-flow determined.

When the switches 10–13 are operated, that is, the direction of the current I through the coil arrangement 3, 4 is reversed, the time-counter 25 starts to count or measure the time. This time counting is continued until the voltage across the measuring resistor 19 is the same as the voltage across the resistors 22, 23. At that time, the comparator 20 sends a signal to the time counter 25, which stops counting and gives out the determined time at its output 26.

The time at the output is compared with a time determined earlier, for example, during initial operation of the flowmeter. In uninterrupted operation the currently determined time should be the same as the time determined earlier and at any rate should have quite small variations within a tolerance range. If this is not the case, it points to a change in the flowmeter that could signify an error in the measuring result.

To compensate for temperature fluctuation, a further resistor (not shown) having a negative temperature coefficient can be arranged in series with the coils 3, 4. The electrical resistance of the current path from the voltage source 9 to the measuring resistor 19 therefore remains substantially the same, regardless of the temperature, so that no changes are caused thereby.

Figure 2:
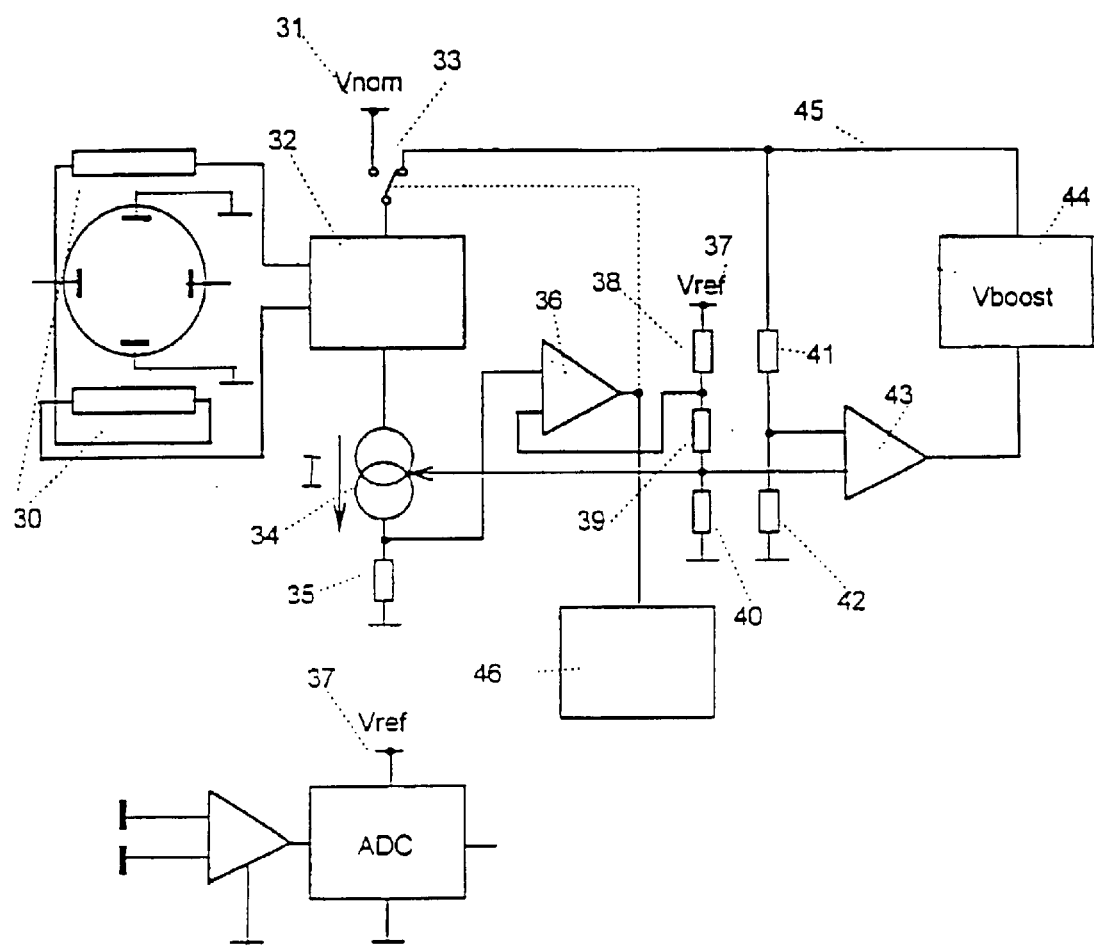
FIG. 2 shows a second embodiment with a supplementary coil supply voltage.

FIG. 2 shows a modified embodiment. The coil arrangement 30 is connected to the H-bridge 32, now represented merely diagrammatically, which is connected between the voltage source 31, which supplies a normal voltage Vnom, and the measuring resistor 35, which in turn is connected to earth. The resistors 38–40 correspond to the resistors 21–23. The comparator 36 corresponds to the comparator 20 and the timer 46 corresponds to the timer 25.

As a modification to the construction according to FIG. 1, a supplementary voltage supply 44 has now been added, which supplies a supplementary voltage Vboost. This supplementary voltage supply 44 is applied via a change-over switch 33 to the H-bridge 32, specifically, from a time at which the current direction is reversed to a time when the current has reached a predetermined value again. The supplementary voltage Vboost is higher than the normal voltage Vnom, so that the rise in the current is effected more quickly.

The current regulator 34 is, as in the construction according to FIG. 1 also, regulated by a reference voltage across the resistor 40 of the voltage divider 37. This voltage serves as reference.

In addition, the voltage across the resistor 40 is supplied to a further operational amplifier 43, the output of which is connected to the supplementary voltage supply system 44. The other input of the operational amplifier 43 is connected to the center tap of a voltage divider comprising two resistors 41, 42, which is arranged between the output 45 of the supplementary voltage supply system 44 and earth. The output of the operational amplifier 43 therefore regulates the supplementary voltage supply system 44, which can also be referred to as the "boost generator".

The output of the comparator 36 not only triggers the time-counter 46, but also the switch 33, so that in the time after change-over not only is the length of time necessary for the current to reach its predetermined value determined, but also in this time an increased voltage is used. This increased voltage moreover has the advantage that it is relatively accurate. Indeed, all voltages are related to the reference voltage Vref.

The time counter 46 determines, as stated, the length of time that is needed for the rise in the coil current after polarity reversal. This time is a measure of the electrical and magnetic properties of the system as a whole. This length of time is unique to a specific system, a kind of "fingerprint".

Because the same reference voltage Vref is used as the basis for regulating the coil current and the supplementary voltage supply system 44, a fixed and precise relationship between the supplementary voltage and the coil current can be reached. When this reference voltage is used at the same time to control the analogue-to-digital converter 28 (FIG. 1), then very accurate measurements can be achieved. The measuring accuracy of the flowmeter is improved and at the same time the electrical and magnetic circuits of the flowmeter can be monitored.

Figure 3:
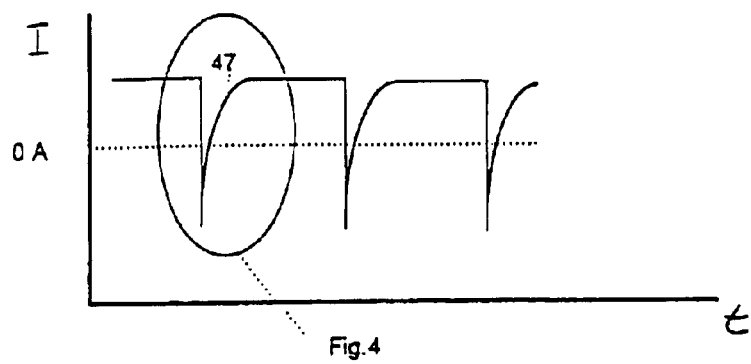
FIG. 3 shows a waveform for the current through a current regulator.

FIG. 3 shows the waveform of the current I through the measuring resistor 19 in FIG. 1. On polarity reversal of the current direction, the coils 2, 3 will first of all try to keep the current at its previous intensity. Because of the free-wheeling diodes 14–17, the current through the measuring resistor 19 will briefly change its sign, the coil current dropping and changing direction.

Figure 4:
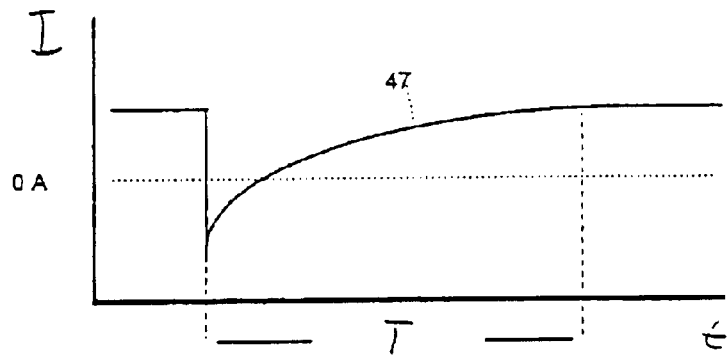
FIG. 4 shows the same waveform, but over a shorter time period.

FIG. 4 shows the same curve 47 to an enlarged scale, that is, for a shorter period. Since the rise in the coil current follows a specific physical natural law, the time period T is a measure that provides information about the rise in the coil current with sufficient reliability and certainty. This time period T should be the same at each change-over, or should vary only by a small differential amount from a set value.

Of course, it is possible also to take several measurements and to plot the curve 47 point by point, which is advantageously done by a microprocessor, not shown specifically. It is therefore possible to determine not only the parameter T, but in fact to compare a curve shape.

Figure 5:
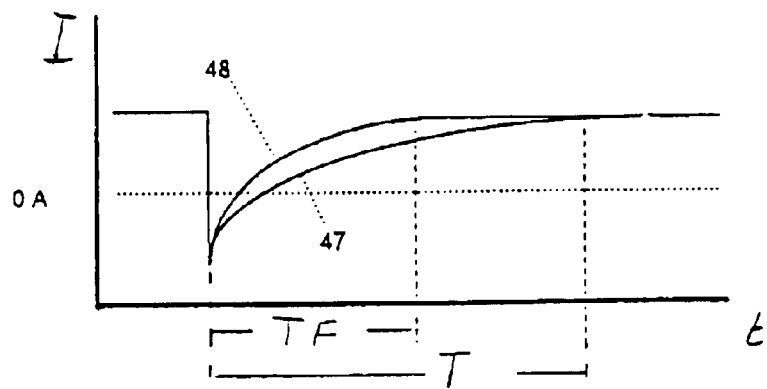
FIG. 5 shows a juxtaposition of two current flows.

In FIG. 5, two curves are shown, of which the curve 47 is produced when the flowmeter is free from defects. In the curve 48, the rise is too rapid, that is, the time TF is too short. The curve 47 has been included again with its rise time T to make the differences clear.

The invention can also be carried out with several stabilised voltages, but in that case they may differ from one another only by relatively small amounts (a few microvolts).

What is claimed is:

1. A method for testing an electromagnetic flowmeter having a measuring tube and a coil arrangement for generating a magnetic field perpendicular to the direction of flow through the measuring tube, the current direction in the coil arrangement being periodically changed, comprising the steps of sensing the change in the current direction, and after the change in the current direction determining at least one parameter of the current rise and comparing the parameter with a reference value determined before the change in current direction.

2. A method according to claim 1, in which testing is carried out during measurement of a throughflow.

3. A method according to claim 1, in which the reference value is determined from the flowmeter at an earlier time.

4. A method according to claim 1, in which a time period that elapses between two predetermined current values is used as the parameter.

5. A method according to claim 1, in which a time period that elapses between change in the current direction and reaching a predetermined current value is used as the parameter.

6. A method according to claim 1, in which after change in the current direction, a stepped-up voltage is used.

7. A method according to claim 1, in which the supply voltage of the coil arrangement is regulated ratiometrically in relation to a reference voltage which is also used to determine the parameter.

8. A method according to claim 1, in which the curve shape of the current rise is used as the parameter.

9. A method according to claim 8, in which the curve shape is formed by current values ascertained at predetermined times.

10. A method according to claim 1, in which current rises following directly one after the other are compared with one another.

11. An electromagnetic flowmeter arrangement comprising a measuring tube, a coil arrangement for generating a magnetic field substantially perpendicular to the direction of flow through the measuring tube, an electrode arrangement substantially perpendicular to the direction of flow and to the magnetic field, a supply system for the coil arrangement which has a current direction change-over arrangement, and a testing device, the testing device including means which, after a change over of the current direction, determines at least one parameter of the rise in the current in the coil arrangement and compares the parameter with a given value determined before the change over of the current direction.

12. An arrangement according to claim 11, in which the testing device comprises a time-counter and a rise time serves as the parameter.

13. An arrangement according to claim 12, in which the testing device further comprises a comparator which compares the current or a variable derived therefrom with a given value and which is connected to the time-counter.

14. An arrangement according to claim 12, in which the time-counter is connected to a checking unit which produces an error message whenever the time ascertained differs by more than a predetermined difference from a given value.

15. An arrangement according to claim 11, in which an electrical resistance is arranged in series with the coil arrangement, the resistance having a temperature-dependent resistance behavior which is inversely proportional to that of the coil arrangement.

16. An arrangement according to claim 11, including a supplementary voltage supply system connected to the supply system by means of a change-over switch.

17. An arrangement according to claim 11, comprising an analogue-to-digital converter, which determines the analogue values in relation to a reference voltage, the value of which is also used as a starting point for determining coil current and coil supply voltage.

* * * * *